(12) United States Patent
Yehudaie

(10) Patent No.: US 7,312,746 B2
(45) Date of Patent: Dec. 25, 2007

(54) METHOD AND SYSTEM FOR CALIBRATION OF A RADIO DIRECTION FINDER

(75) Inventor: Efraim Yehudaie, Rishon Lezion (IL)

(73) Assignee: Elta Systems Ltd., Ashdod (IL)

( * ) Notice: Subject to any disclaimer, the term of this patent is extended or adjusted under 35 U.S.C. 154(b) by 83 days.

(21) Appl. No.: 11/113,129

(22) Filed: Apr. 25, 2005

(65) Prior Publication Data

US 2006/0238413 A1    Oct. 26, 2006

(51) Int. Cl.
*G01S 13/00* (2006.01)
*H04B 1/00* (2006.01)
*H04M 1/00* (2006.01)

(52) U.S. Cl. .......................... 342/159; 455/63; 455/1; 455/552; 375/134

(58) Field of Classification Search ................ 455/63; 375/134, 139; 343/705
See application file for complete search history.

(56) References Cited

U.S. PATENT DOCUMENTS

| | | | |
|---|---|---|---|
| 4,494,118 A | | 1/1985 | Graves |
| 4,597,087 A | * | 6/1986 | Kadin .......................... 375/134 |
| 5,257,284 A | * | 10/1993 | Skudera et al. ............ 375/139 |
| 5,859,613 A | | 1/1999 | Otto et al. |
| 6,806,837 B1 | * | 10/2004 | Saucier et al. ............. 343/705 |
| 7,016,649 B1 | * | 3/2006 | Narasimhan et al. ....... 455/63.1 |
| 2003/0187601 A1 | | 10/2003 | Doufor et al. |
| 2003/0197643 A1 | | 10/2003 | Fullerton et al. |

OTHER PUBLICATIONS

ATIS Committee, Feb. 28, 2001, Definition: Frequency Hopping.*

* cited by examiner

*Primary Examiner*—Thomas Tarcza
*Assistant Examiner*—Harry Liu
(74) *Attorney, Agent, or Firm*—Browdy and Neimark, P.L.L.C.

(57) ABSTRACT

A calibration method and a system for providing calibration data for use with a direction finder are provided. The method comprises providing a relative motion of a calibration receiver in a circle manner with respect to calibration transmitter at a predetermined distance from each other. The method also includes preparing and transmitting a communication frequency signal employed for transmitting a certain frequency from a list of predetermined frequencies. The preparing comprises: (a) setting a value of the dwell time ranges of the communication frequency signal to a predetermined value; (b) synchronizing in time the dwell time ranges between the calibration transmitter and the calibration receiver by using clock signals of a common synchronization source; (c) providing a hop duration time interval within the dwell time range for transmitting the frequency; and (d) generating the communication frequency signal corresponding to the frequency during the hop duration interval. At the calibration receiver end, the method includes scanning the list of predetermined frequencies; intercepting a frequency signal transmitted during the hop duration time interval within the dwell time ranges; and rejecting all other frequency signals received within the dwell time ranges having duration different than the hop duration time interval by the receiver.

17 Claims, 3 Drawing Sheets

METHOD AND SYSTEM FOR CALIBRATION OF A RADIO DIRECTION FINDER

FIELD OF THE INVENTION

The present invention relates to a technique for direction finding and more particularly to a method and a system for calibrating a radio direction finder.

BACKGROUND OF THE INVENTION

Radio direction finders (RDF) are well known in the art as tools for finding the direction to a source of electromagnetic radiation. A direction finder may, for example, be a ground-based, an airborne or seaborne system that provides a possibility to locate or monitor various radio signal sources, stationary or movable, by determining the direction of the bearing line to the source. RDFs have many applications which may require the ability to determine the coordinates of radio source over a broad range of broadband frequencies. For instance, wideband RDFs may scan a frequency range of a few MHz to several thousand MHz.

A radio direction finder utilizes an array of antennas (usually two or more) dispersed along the surface of the measurement platform. For ground-based systems, the antennas are typically stationary and the directional information obtained is used to locate the signal source. In aerial or nautical applications, the antennas are carried by a mobile platform, such an aircraft or ship, to receive an electromagnetic signal and process it for obtaining the bearing line from this platform to a source of electromagnetic radiation. In that regard, if the position of the signal source is fixed and known, RDF can be used to determine the platform's position relative to the fixed signal source and, hence, the platform's location. Alternatively, if the platform's position is known, RDF can be used to locate the signal source. For instance, this source can be originated from transmitters used by enemy troops, transmission sources associated with weapons and ordinance, or can be radiation from any type of communications device.

The determination of direction employs amplitude and/or phase comparisons of the signals received by the different antennas from the source of the electromagnetic radiation. Since the antenna's patterns are affected by the platform on which they are mounted a calibration process is required to account for un-calculable effects.

Referring to FIG. 1, the conventional calibration of an airborne radio direction finder can involve the flying of a surveillance aircraft 11 in a horizontal plane in a circular manner so that the aircraft turned 360° in azimuth. The calibration system includes a calibration transmitter 12 arranged at a ground calibration station in the known location on the ground, and a calibration receiver 13 arranged at the aircraft 11. The calibration transmitter 12 is capable of transmitting electromagnetic signals in a predetermined frequency range while the aircraft moves in the manner that all required azimuth angles $\phi$ and depression angles $\Theta$ are covered. For instance, the depression angle can be close to 0° when the aircraft is distant from the calibration transmitter 12, while be close to 90° when the aircraft flies directly over the calibration transmitter 12.

Referring to FIG. 2, an exemplary diagram of a conventional calibration electromagnetic signal transmitted by the calibration transmitter is illustrated. For the predetermined frequency range, the calibration signal is sampled over time so that a set of required frequencies $f_1, f_2, \ldots, f_n$ is transmitted cyclically to the aircraft from the ground calibration station. As a result of the calibration process, a set of calibration tables is formed establishing a relationship between amplitude and/or phase differences between signals received by the antennas, frequencies $f_1, f_2, \ldots, f_n$, azimuth angles $\phi 1, \phi 2, \ldots, \phi m$ and depression angles $\Theta 1, \Theta 2 \ldots, \Theta k$; where n is the number of the measurement frequencies, m and k are the numbers of the selected azimuth and depression angles, respectively, at which the measurements are carried out. The quality of the calibration is dictated by the number n of the frequencies and angle increments (resolution) at which the measurements are carried out, and the purity of the environmental spectrum.

In the conventional calibration technique, each frequency is transmitted/received for a relatively long time period, e.g., 250-500 milliseconds, that results into a rather slow calibration process. Typically, the data, which can be collected during each collection circle of the vehicle, do not exceed the data corresponding to about 10 frequencies. Another drawback of the conventional calibration technique is in the fact that the long transmission time period also increases the probability of being exposed to the interference with the signals originated from external transmitters. Conventionally, if such interference is noticed, the operator usually rejects the collected data, and then resumes another collection of the data with a frequency offset corresponding to the interfered frequency. However, in most cases the operator cannot distinguish between appropriate signals and interfered signals, and therefore cannot eliminate the interference data from the corrupted data in order to use it for generation of a calibration table.

Moreover, in the conventional techniques, synchronization between the ground transmitter and the onboard calibration receiver is based on a detection process. More specifically, in the beginning, the onboard calibration receiver is set to the measurements at the first frequency $f_1$ from the set $f_1, f_2, \ldots, f_n$, as soon as the successful interception of the first signal of the corresponding frequency is performed. Then, the system steps to the next entries of the frequency set. Hence, the conventional synchronization is based on the detection of the first frequency of the set in each retransmission cycle. Any time that this frequency is interfered with the environment electromagnetic signals, it can cause lose of the synchronization. Thus, in order to avoid the interference with the environment electromagnetic signals, the calibration flight, preferably, is carried out at only certain hours of day or at certain distances from the sources of the environment electromagnetic signals. Because of these reasons, the conventional calibration process requires intensive interaction between the ground transmission station and the onboard operators, which by itself increases the interference and demands a skilled ground operator.

SUMMARY OF THE INVENTION

Thus, there is still a need in the art for, and it would be useful to have, novel calibration system and method for direction finding techniques.

The present invention partially eliminates disadvantages of the conventional calibration technique and provides a new implementation scheme which enables to enhance the calibration process.

According to one embodiment of the invention the present invention, a dwell time range of the communication frequency signals used for transmitting/receiving each frequency is set to a predetermined value. Preferably, this predetermined value is selected to be as short as possible, e.g., 0.2-100 milliseconds. The limitation on the duration of the dwell time is associated with a magnitude of the signal-to-noise ratio required by the on-board calibration receiver. The decrease of the dwell time decreases the probability of interference with the electromagnetic signals of the environment.

Moreover, according to another embodiment of the invention, the receiver and the calibration transmitter are synchronized in time by using a common synchronization source. An example of the synchronization source includes, but is not limited to, GPS (Global Positioning System). In other words, contrary to the prior art technique, where the synchronization is based on a detection process and no time synchronization is utilized, the present invention employs common clock signals for synchronization communication frequency signals at the calibration transmitter and receiver ends.

Furthermore, in accordance with yet another embodiment of the invention, a certain time interval ("hop" duration) is selected within the dwell time range for transmitting each desired frequency. In other words, contrary to the prior art techniques, where the time interval used for transmitting each desired frequency coincided with the dwell time range, in the present invention, only a part of the dwell time range is used for the transmission. The utilization of a transmitting pulse with a predetermined known duration used as a coding of the frequency signals enables the system to identify it and ignore the other signals providing environment interference. According to a further embodiment of the invention, the hop duration interval is located at the middle of the dwell time range. All other signals that do not meet these requirements are rejected.

The present invention also satisfies the aforementioned need by providing a calibration system for providing calibration data for use with a direction finder. The calibration system includes a calibration transmitter, a calibration receiver (herein also referred to as "target platform"), and a synchronization clock source coupled to the calibration transmitter and receiver.

It should be understood that generally, the calibration system can be an airborne calibration system, a satellite calibration system, a seaborne calibration system, and/or ground calibration system. Accordingly, the calibration transmitter and the calibration receiver, each can be arranged either at terrestrial or non-terrestrial calibration stations. The terrestrial station and non-terrestrial calibration station, each can be either mobile or stationary.

According to an embodiment of the present invention the calibration transmitter includes a transmitting antenna, a transmitter synchronization module, a frequency signal generator coupled to the transmitting antenna, and a controller unit coupled to the transmitter synchronization module and the frequency signal generator.

The transmitting antenna is configured for radiating electromagnetic radiation in a predetermined wide frequency range in a required direction. The transmitter synchronization module is configured for providing transmitter synchronization clock signals. The frequency signal generator is configured for generating communication frequency signals corresponding to a list of predetermined frequencies. The controller unit is configured for receiving the transmitter synchronization clock signals and producing controller signals required for triggering operation of the frequency signal generator to generate the frequency signals sequentially from the list of predetermined frequencies during hop duration intervals located within dwell time ranges of the communication frequency signals.

The calibration receiver includes an array of antennas, a receiver synchronization module, and an onboard direction finder sensor associated with the array of antennas and coupled to the receiver synchronization module.

Examples of the direction finder sensor include, but are not limited to, COMINT system ELINT system, and radar direction finding systems employing an interferometer technique.

The array of antennas is configured to receive radio frequency electromagnetic transmissions from the calibration transmitter. The receiver synchronization module is configured to provide synchronization clock signals equal to the clock signals of the transmitter synchronization module. The onboard direction finder sensor is configured for scanning the same list of predetermined frequencies as in the ground station, intercepting frequency signals transmitted during hop duration time intervals located within the dwell time ranges, and rejecting all other frequency signals received within the dwell time ranges having duration different than the hop duration time intervals.

The calibration method and system of the present invention has many of the advantages of the technique mentioned theretofore, while simultaneously overcoming some of the disadvantages normally associated therewith.

For example, the known duration of the transmitting pulses corresponding to transmitted calibration frequencies is used to filter out undesired signals received by the calibration receiver.

Moreover, the signals having short duration pulses cause minimal interference with other neighbor systems. Thus, it makes easier to obtain permission to operate the calibration system.

In accordance with the calibration scheme of the present invention, the number of transmitted frequencies and the number of retransmission cycles (per flight) can be increased, thus better resolution in frequency and angles can be achieved. Hence, a complete set of calibration data can be obtained in one flight/sailing path.

Likewise, due to the high amount of the collected number of frequency signals, there is no need to update the frequency list. In particular, the data of the measurements obtained at the interfering frequencies could be neglected, because of redundancy of the number of the frequencies.

The calibration system utilizing the calibration scheme of the present invention does not require skilled operators of the calibration station, due to the fact that updating of the frequency list according to the environmental interference (which in conventional system had to be done online simultaneously in the target platform and the calibration transmitter end) is not required anymore.

By using the method and system of the present invention, it is not necessary to perform calibration flight at only certain hours of day or at certain locations to avoid interference.

The time synchronization technique employed by the present invention increases the time efficiency of the measurements. Moreover, contrary to the prior art technique, it does not dependent on the detection process.

Thus, according to one broad aspect of the invention, there is provided in a method for providing calibration data for use with a direction finder, the improvement comprising the following method steps all carried out at a calibration transmitter end adaptive for communication with a remote calibration receiver:

(a) setting a value of at least one dwell time range of a communication frequency signal employed for transmitting a frequency from a list of predetermined frequencies to a predetermined value;

(b) synchronizing in time said at least one dwell time range between a calibration transmitter and a calibration receiver by using clock signals of a common synchronization source;

(c) providing a hop duration time interval within said at least one dwell time range for transmitting said frequency;

(d) generating and transmitting said communication frequency signal corresponding to said frequency during said hop duration interval.

According to another broad aspect of the invention, there is provided in a method for providing calibration data for use with a direction finder, the improvement comprising the following method steps all carried out at a calibration receiver end adaptive for communication with a calibration transmitter:

(a) providing synchronization in time between a calibration transmitter and the calibration receiver by using clock signals of a synchronization source for at least one dwell time range of a communication frequency signal employed for transmitting a frequency from a list of predetermined frequencies;

(b) scanning the list of predetermined frequencies;

(c) intercepting a frequency signal transmitted during a hop duration time interval within said at least one dwell time range; and (d) rejecting all other frequency signals received within said at least one dwell time range having duration different than said hop duration time interval.

According to a further broad aspect of the invention, there is provided a calibration system for providing calibration data for use with a direction finder, the calibration system utilizing a calibration transmitter including a transmitting antenna, a signal generator operable for transmitting communication frequency signals corresponding to a list of predetermined frequencies, and a calibration receiver including an array of antennas for receiving radio frequency transmissions from the calibration transmitter, the calibration system comprising:

(i) transmitter and receiver synchronization modules configured for providing, respectively, transmitter and receiver clock signals, (ii) a controller unit coupled to the transmitter synchronization module and the frequency signal generator, and configured for receiving said transmitter synchronization clock signals and producing controller signals required for triggering operation of the frequency signal generator to generate the frequency signals sequentially from said list of predetermined frequencies during hop duration intervals located within dwell time ranges of said communication frequency signals;

(iii) an onboard direction finder sensor associated with said array of antennas and coupled to the receiver synchronization module, the direction finder sensor being configured for scanning the list of predetermined frequencies, intercepting frequency signals transmitted during hop duration time intervals located within the dwell time ranges, and rejecting all other frequency signals received within the dwell time ranges having duration different than said hop duration time intervals; and (iv) a synchronization clock source coupled to the transmitter synchronization module and the receiver synchronization module, and being configured for synchronizing clock signals provided by the transmitter and receiver synchronization modules.

According to yet a broad aspect of the invention, there is provided a method for providing calibration data for use with a direction finder, comprising:

(A) providing a relative motion of a calibration receiver in a circle manner with respect to calibration transmitter at a predetermined distance from each other, (B) preparing a communication frequency signal employed for transmitting a frequency from a list of predetermined frequencies, said preparing comprises:

(a) setting a value of at least one dwell time range of said communication frequency signal to a predetermined value;

(b) synchronizing in time said at least one dwell time range between the calibration transmitter and the calibration receiver by using clock signals of a common synchronization source;

(c) providing a hop duration time interval within said at least one dwell time range for transmitting said frequency;

(d) generating said communication frequency signal corresponding to said frequency during said hop duration interval.

(C) transmitting said communication frequency signal towards said calibration receiver;

(D) scanning the list of predetermined frequencies the calibration receiver;

(E) intercepting a frequency signal transmitted during the hop duration time interval within said at least one dwell time range by the calibration receiver; and (G) rejecting all other frequency signals received within said at least one dwell time range having duration different than said hop duration time interval by the receiver;

(H) producing a Signal Descriptor based on the frequency signal intercepted in step (E).

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, preferred embodiments will now be described, by way of non-limiting examples only, with reference to the accompanying drawings, in which.

DETAILED DESCRIPTION OF THE INVENTION

Figure 1:
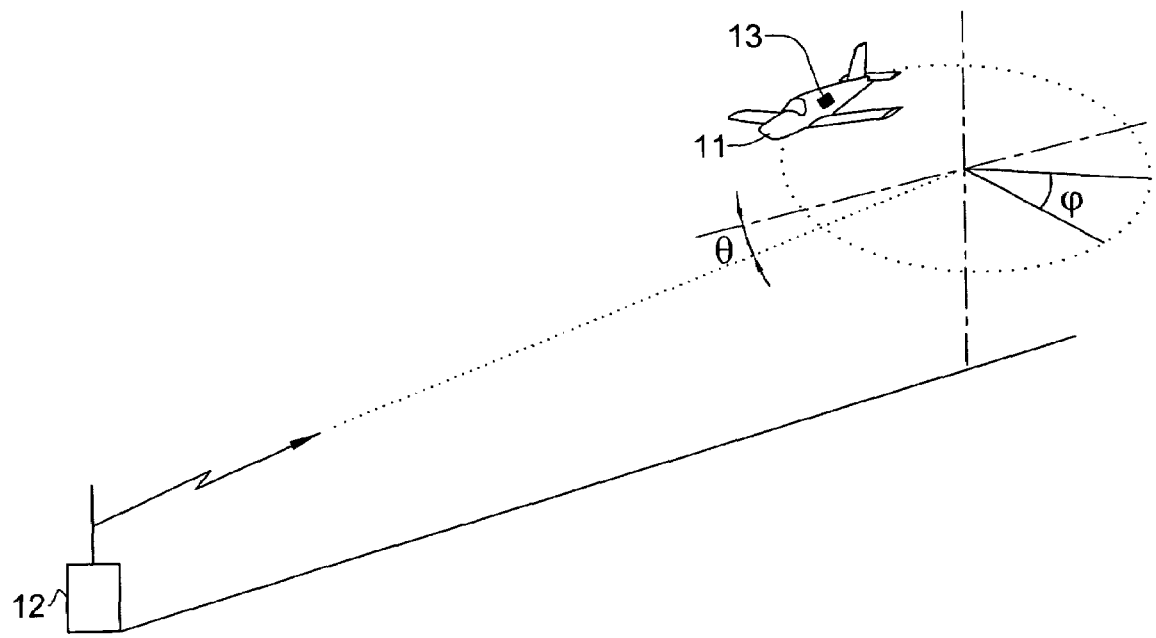
FIG. 1 illustrates an exemplary scheme of in-flight calibration process.
Figure 2:
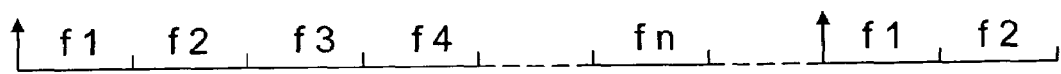
FIG. 2 is a pulse diagram of the electromagnetic signal used in a conventional calibration technique.

The principles and operation of the calibration process and system according to the present invention may be better understood with reference to the drawings and the accompanying description, wherein like reference numerals have been used throughout to designate identical elements, where it is convenient for description. It is understood that these drawings are given for illustrative purposes only and are not meant to be limiting.

Figure 3:
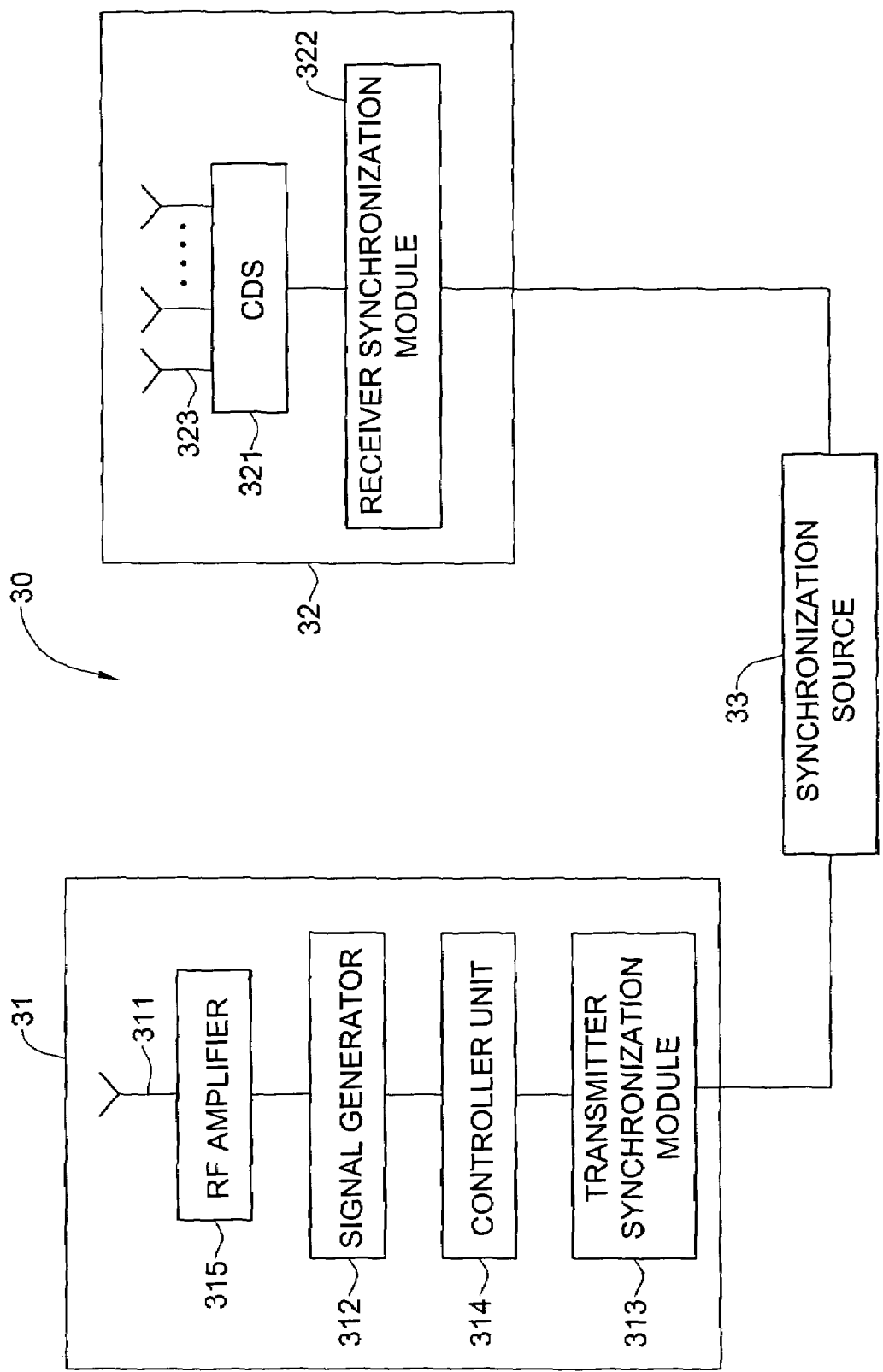
FIG. 3 illustrates a schematic block diagram of a calibration system for providing calibration data, in accordance with an embodiment of the present invention.

Referring to FIG. 3, a schematic block diagram of a calibration system 30 for providing calibration data is illustrated, in accordance with an embodiment of the present invention. It should be noted that the blocks in FIG. 3 are intended as functional entities only, such that the functional relationships between the entities are shown, rather than any physical connections and/or physical relationships.

The calibration system 30 includes a calibration transmitter 31, a calibration receiver 32, and a synchronization source 33 common for the calibration transmitter 31 and the calibration receiver 32.

It should be understood that generally, the calibration system 30 can be an airborne calibration system, a satellite calibration system, a seaborne calibration system, and/or ground calibration system. Accordingly, the calibration transmitter 31 and the calibration receiver 32, each can be arranged either at terrestrial or non-terrestrial calibration stations which, in turn, can be either mobile or stationary.

According to one example, the calibration transmitter and the calibration receiver, each can be arranged at the corresponding terrestrial calibration station (not shown). The terrestrial calibration stations can be either stationary or mounted on a mobile platform, e.g., an automobile.

According to another example, the calibration transmitter and the calibration receiver, each can be arranged at the corresponding non-terrestrial calibration stations (not shown) mounted on mobile platforms selected from an aircraft, ship and satellite.

The synchronization source 33 is configured for generating a clock signal required for time synchronization of the calibration transmitter 31 and the calibration receiver 32. An example of the synchronization source 33 suitable for the purpose of the present invention includes, but is not limited to, GPS (Global Positioning System).

The calibration transmitter 31 includes a transmitting antenna 311, a signal generator 312 coupled to the transmitting antenna 311, a transmitter synchronization module 313, and a controller unit (system) 314 coupled to the transmitter synchronization module 313 and the frequency signal generator 312. The transmitting antenna 311 is configured for radiating electromagnetic radiation in a predetermined wide frequency range towards the calibration receiver 32. The transmitter synchronization module 313 is coupled to the synchronization source 33. The frequency signal generator 312 is configured for generating frequency signals corresponding to a list of predetermined frequencies $f_1, f_2, \ldots, f_n$. The controller unit 314 is configured to receive the clock signal from the transmitter synchronization module 313 and produce controller signals required for triggering operation of the frequency signal generator 312 for generating frequency signals sequentially from the list of the predetermined frequencies. When required, the calibration transmitter 31 can further include an RF amplifier 315 coupled to the transmitting antenna 311 and the frequency signal generator 312, and configured for amplifying the frequency signals produced by the signal generator 312, and relaying the amplified frequency signals to the transmitting antenna 311.

According to an embodiment of the invention, the calibration receiver 32 (target platform) includes an onboard direction finder sensor (DFS) 321, a receiver synchronization module 322, and an array of antennas 323 associated with the DFS 321.

Examples of the direction finder sensor 321 include, but are not limited to, COMINT (communication intercept) system and ELINT (electronic intelligence) system produced, for example, by the Applicant of the present application, and radar direction finding systems employing an interferometer technique.

The receiver synchronization module 322 is configured to provide synchronization clock signals equal to the synchronization clock signals used at the calibration transmitter 31. The antennas 323 are dispersed along the surface of the measurement target platform, and configured to receive radio frequency electromagnetic transmission from the calibration transmitter 31 and provide it to the DFS 321 in the form of communication signals representing a sequence of frequency signals.

In operation, at the calibration transmitter end, the controller unit 314 loads into the frequency signal generator 312 a list of predetermined frequencies $f_1, f_2, \ldots, f_n$ selected for the calibration process. Moreover, the controller unit 314 generates the controller signal and provides this signal to the frequency signal generator 312 for triggering thereof to produce the frequency signals sequentially from the list of the predetermined frequencies. The controller signal is indicative of the desired dwell time range, a "hop" duration time interval (i.e., a certain time interval during which each frequency is transmitted), and a time delay defining a position of the hop duration interval within the dwell time range, as will be described hereinbelow in detail.

Figure 4:
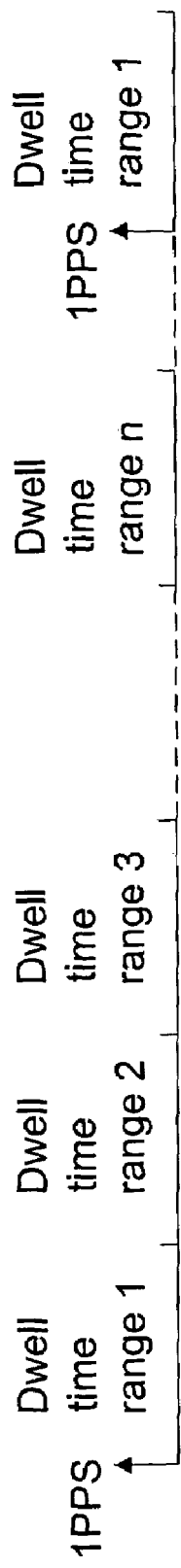
FIG. 4 illustrates an exemplary scheme of synchronization of the calibration system of the present invention.
Figure 4:
Figure 4:
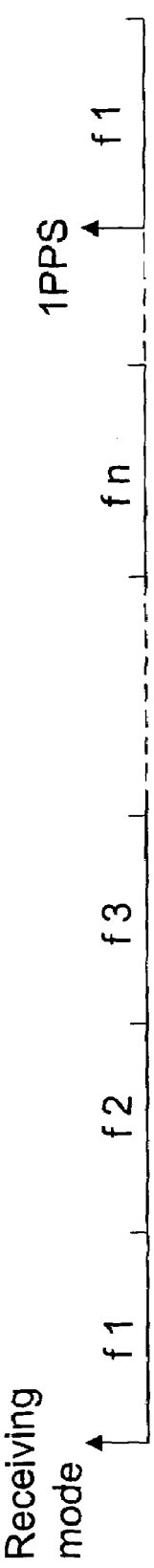

Referring to FIG. 3 and FIG. 4 together, the dwell time range of the pulses of the communication signals used for transmitting/receiving each frequency is set to a predetermined value (see Diagram A). Preferably, this predetermined value is selected to be as short as possible, e.g., 0.2-100 milliseconds. The decrease of the dwell time reduces the probability of interference with the electromagnetic signals of the environment. The limitation on the duration of the dwell time is associated, inter alia, with a magnitude of the signal-to-noise ratio required by the on-board calibration receiver.

According to one example, magnitudes of the dwell time ranges of the communication frequency signals employed for transmitting/receiving the frequencies $f_1, f_2, \ldots, f_n$ are all equal. According to another example, magnitudes of the dwell time ranges of some or all of the communication frequency signals corresponding to different frequencies can be different.

In accordance with an embodiment of the invention, the operation of the calibration transmitter 31 and the calibration receiver 32 are synchronized in time by using the GPS. It should be appreciated by a person skilled in the art that contrary to the prior art technique, where the synchronization is based on a detection process and no time synchronization is utilized, the present invention employs a common clock signal for synchronization dwell time ranges at the calibration transmitter and receiver ends.

For example, when the dwell time ranges are all set to 5 milliseconds and a synchronization period of the clock signals (generated by the GPS) is set to 1 PPS the number of frequencies that can be handled by the calibration system in one second equals 200. In other words, calibration data corresponding to 200 frequencies can be collected in one flight/sailing calibration path.

It should be appreciated that if more than 200 frequencies are required for completing the calibration process, the synchronization period can be extended from one second to two (or more) seconds, thereby to achieve the capability to collect data from 400 (or more) frequencies in one calibration path.

In particular, the two-second-synchronization regime can be implemented by filtering out all the odd 1 PPS signals. In this case, resynchronization takes place in the calibration transmitter 31 and the calibration receiver 32 only for the even PPS signals.

In accordance with an embodiment of the invention, the controller unit 314 sets certain time intervals (i.e., "hop" duration time interval) during which each desired frequencies are transmitted. The hop duration intervals are selected within the dwell time ranges (see Diagram B). For example, when the dwell time ranges are equal for all the frequency signals and set to 5 milliseconds, the hop duration time intervals can be set to 3 milliseconds for all the frequency signals.

It should be appreciated by a person versed in the art that contrary to the prior art techniques, where the time interval used for transmitting each desired frequency coincided with the dwell time range, in the present invention, only a part of the dwell time range is used for the transmission. The utilization of a transmitting pulse with a predetermined known duration enables the system to identify it and ignore the other signals providing environment interference.

In accordance with a further embodiment of the invention, the controller unit 314 sets values of time delay defining a position of the hop duration interval within the corresponding dwell time range. Preferably, but is not mandatory that each hop duration time interval for transmitting the corresponding frequency is located in the middle of the corresponding dwell time range (as shown in diagram B). In order that the hop duration interval was in the middle of the dwell time range when the signal arrives at the receiver, the time required for the traveling of the communication signals between the calibration transmitter 31 and the calibration receiver 32 should be taken into account in the synchronization process. In this case, for the transmitting frequency signal the value of the time delay for positioning the hop duration interval within the dwell time regions can be calculated in accordance with the following equation:

$$t_D = (t_{DW} - t_h)/2 - S/c,$$

where $t_D$ is the time delay; $t_{DW}$ is the corresponding dwell time range; $t_h$ is the hop duration time interval; S is the distance between the calibration transmitter 31 and the calibration receiver 32; and c is the light velocity.

For example, when the dwell time ranges are all set to 5 milliseconds and the hop duration intervals are set to 3 milliseconds, a value of the time delay for all the hop duration intervals can be calculated as 1 millisecond minus the signal propagation time between the calibration transmitter 31 and the calibration receiver 32.

In operation for each synchronization clock signal, the controller unit 314 generates a controller signal (indicative of the desired dwell time ranges, the hop duration time intervals, and the time delays) and relays it to the signal generator 312. The signal generator 312, triggered by controller signal, sweeps the frequency list table once at the dwell time rate, and then transmits each frequency over the required hop duration time interval which position within the dwell time range is determined by the required time delay, as described above.

In operation, the calibration transmitter 31 transmits continuously the communication frequency signals corresponding to the predetermined frequency list, prepared as described above. A relative motion in a circle manner (clockwise or counterclockwise) of the calibration receiver 32 is provided with respect to the calibration transmitter 31 at a predetermined distance from each other, but within the operational rage of the calibration receiver 32. The communication signals intercepted by the calibration receiver 32 should have such magnitude in order to meet the required signal-to-noise condition.

It should be understood that the relative motion of the calibration receiver 32 with respect to the calibration transmitter 31 includes the case when, for example, the calibration receiver 32 moves with respect to the ground, while the calibration transmitter 31 is motionless. According to another example, the calibration receiver 31 can be motionless, while the calibration transmitter 32 moves with respect to the ground. According to yet an example, the calibration receiver 31 and the calibration transmitter 32 can be in the relative motion, as described above, when they both move with respect to the ground.

At the calibration receiver end, the list of the predetermined frequencies is loaded in the DFS 321. Then, for each clock signal of the receiver synchronization module, the DFS 321 starts scanning sequentially the list of the predetermined frequencies. For example, 1 PPS timing strobe obtainable from the common GPS (Global Positioning System) source can be used as a clock signal. The DFS 321 is set for intercepting each frequency signal from the predetermined frequency list over the dwell time range (see Diagram C).

According to one embodiment of the invention, the DFS 321 is configured to intercept a signal only within a defined duration, such as a predetermined hop duration time interval; all other signals (that do not meet this requirement) are rejected. For example, as described above, when the dwell time ranges are set to 5 milliseconds, and the hop duration intervals are set to 3 milliseconds, the calibration transmitter 31 transmits communication signals for each frequency over 3 milliseconds every 5 milliseconds. According to this example, the DFS 321 takes into account only 3 milliseconds signals intercepted within 5 milliseconds dwell time ranges.

According to a further embodiment of the invention, the DFS 321 is configured to accept only those frequency signals which are not only have predetermined hop duration intervals, but also located at the middle of the dwell time range. According to this embodiment, all other signals that do not meet these requirements are rejected.

In operation, for each dwell time range that includes a valid intercepted signal, the DFS 321 produces a Signal Descriptor (SD). Examples of data in the Signal Descriptor can include, but are not limited to the following parameters:

Signal "Rxx" array that contains the information about phase and amplitudes of the intercepted signals for each antenna from the antenna array 323 of the calibration receiver 32;

Detection parameters of the signal, such as signal duration, phase quality, etc;

Direction of Arrival (DOA) of the signal, when exist;

Navigation data as reported by a navigation system of the target platform at the time of the intercepting the frequency signal, such as: Latitude, Longitude, Altitude, Pitch, Roll and heading;

Time of interception of the reported frequency signal.

The DFS 321 can relay the SD to a host computer (not shown) for on-line monitoring, analyzing and building calibration tables. When required, the data can be stored in a memory device (not shown) for a further off-line analyzing and generating the calibration tables.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

It should be understood that although the transmitter synchronization module 313 and the receiver synchronization module 322 described above were described as receiving the synchronization clock signal from GPS, any other very accurate synchronization source, e.g., atomic clocks, can be also implemented at the calibration transmitter 31 end and the calibration receiver 32 end (target platform) for the synchronization purpose.

Also, it is to be understood that the phraseology and terminology employed herein are for the purpose of description and should not be regarded as limiting.

In the method claims that follow, alphabetic characters used to designate claim steps are provided for convenience only and do not imply any particular order of performing the steps.

It is important, therefore, that the scope of the invention is not construed as being limited by the illustrative embodiments and examples set forth herein. Other variations are possible within the scope of the present invention as defined in the appended claims and their equivalents.

The invention claimed is:

1. A calibration system for providing calibration data for use with a direction finder, comprising:
   (a) a calibration transmitter including:
      (i) a transmitting antenna,
      (ii) a transmitter synchronization module configured for providing transmitter clock signals,
      (iii) a signal generator operable for transmitting communication frequency signals corresponding to a list of predetermined frequencies,
      (iv) a controller unit coupled to said transmitter synchronization module and said frequency signal generator, and configured for receiving said transmitter synchronization clock signals and producing controller signals required for triggering operation of the frequency signal generator to generate the communication frequency signals sequentially from said list of predetermined frequencies and to transmit said communication frequency signals only during hop duration intervals located within dwell time ranges of said communication frequency signals; and
   (b) a remote calibration receiver including:
      (i) an array of receiving antennas for receiving radio frequency transmissions from the calibration transmitter,
      (ii) a receiver synchronization module configured for providing receiver clock signals,
      (iii) an onboard direction finder sensor associated with said array of receiving antennas and coupled to the receiver synchronization module, the direction finder sensor being configured for scanning the list of predetermined frequencies, intercepting frequency signals transmitted during said hop duration time intervals located within the dwell time ranges, rejecting all other frequency signals received within the dwell time ranges having duration different than said hop duration time intervals, producing a Signal Descriptor based on the intercepted frequency signals and creating said calibration data based on said Signal Descriptor; and
   (c) at least one clock source coupled to the transmitter synchronization module and the receiver synchronization module, and being configured for synchronizing clock signals provided by the transmitter and receiver synchronization modules.

2. The calibration system of claim 1 wherein said synchronization source is selected from GPS and atomic clock.

3. The calibration system of claim 1 wherein said hop duration time intervals are located in the middle of the dwell time ranges.

4. The calibration system of claim 1 wherein the direction finder sensor further configured for rejecting all other frequency signals received within the dwell time ranges having location different than said hop duration time intervals.

5. The calibration system of claim 1 wherein the direction finder sensor is selected from COMINT system, ELINT system and radar direction finding systems employing an interferometer technique.

6. The calibration system of claim 1 wherein said calibration transmitter is arranged at a terrestrial calibration station.

7. The calibration system of claim 1 wherein said calibration transmitter is arranged at a non-terrestrial calibration station mounted on a mobile platform, selected from an aircraft, ship and satellite.

8. The calibration system of claim 1 wherein said calibration receiver is arranged at a terrestrial calibration station.

9. The calibration system of claim 1 wherein said calibration receiver is arranged at a nonterrestrial calibration station mounted on a mobile platform selected from an aircraft, ship and satellite.

10. A method for providing calibration data for use with a direction finder, comprising:
   (A) providing a relative motion of a calibration receiver with respect to calibration transmitter at a predetermined distance from each other;
   (B) setting a predetermined value of at least one dwell time range of a communication frequency signal employed for transmitting at least one frequency from a list of predetermined frequencies;
   (C) providing a hop duration time interval within said at least one dwell time range for transmitting said at least one frequency;
   (D) generating said communication frequency signal corresponding to said at least one frequency;
   (E) transmitting said communication frequency signal by the calibration transmitter towards said calibration receiver only during said hop duration time interval;
   (F) providing synchronization in time between the calibration transmitter and the calibration receiver for said at least one dwell time range by using clock signals of a synchronization source;
   (G) scanning the list of predetermined frequencies by the calibration receiver; (H) intercepting a frequency signal transmitted during the hop duration time interval within said at least one dwell time range by the calibration receiver;
   (I) rejecting all other frequency signals received within said at least one dwell time range having duration different than said hop duration time interval by the receiver;
   (J) producing a Signal Descriptor based on the frequency signal intercepted in step (H);

(K) creating said calibration data based on said Signal Descriptor.

11. The method of claim 10 wherein said hop duration time interval is located in the middle of the dwell time range.

12. The method of claim 10 wherein said providing of the hop duration time interval within the dwell time range includes:
   defining a predetermined location of said hop duration interval within the dwell time range;
   calculating a time delay required for locating said hop duration interval at said predetermined location.

13. The method of claim 10 wherein a value of said time delay is calculated in accordance with an equation $t_D = (t_{DW} - t_h)/2 - S/c$, where $t_D$ is the time delay; $t_{DW}$ is the dwell time range; $t_h$ is the hop duration interval; S is the distance between the calibration transmitter and the calibration receiver; and c is the light velocity.

14. The method of claim 10 further comprising rejecting all other frequency signals received within said at least one dwell time range having location different than said hop duration time interval.

15. The method of claim 10 wherein the value of said at least one dwell time range is selected to be so short that a magnitude of a signal-to-noise ratio was in the limits of the magnitude required by the calibration receiver.

16. The method of claim 10 wherein the value of said at least one dwell time range is between 0.2 milliseconds and 100 milliseconds.

17. The method of claim 10 wherein said calibration data are built in a calibration table.

* * * * *